United States Patent [19]

Holter et al.

[11] 4,257,191
[45] Mar. 24, 1981

[54] MOISTURE RESERVOIR FOR FERTILE SOILS FOR PLANTS

[75] Inventors: Heinz Holter, Gladbeck; Heinz Gresch, Dortmund-Derne; Heinrich Igelbuscher, Gladbeck, all of Fed. Rep. of Germany

[73] Assignee: Industrie-Wert Beteilisungegellschaft mbH, Mainz, Fed. Rep. of Germany

[21] Appl. No.: 50,278

[22] Filed: Jun. 19, 1979

[30] Foreign Application Priority Data

Jun. 29, 1978 [DE] Fed. Rep. of Germany ....... 2828488
Dec. 15, 1978 [DE] Fed. Rep. of Germany ....... 2854131
Feb. 17, 1979 [DE] Fed. Rep. of Germany ....... 2906141

[51] Int. Cl.$^3$ ............................................. A01G 29/00
[52] U.S. Cl. .......................................... 47/48.5; 47/80; 405/38; 405/44
[58] Field of Search ................... 47/48.5, 79–80; 405/38, 44–49

[56] References Cited

U.S. PATENT DOCUMENTS

| | | | |
|---|---|---|---|
| 666,072 | 1/1901 | Sherman | 47/48.5 |
| 728,088 | 5/1903 | Dillon | 47/48.5 X |
| 1,401,386 | 12/1921 | Woodberry | 47/48.5 X |
| 1,608,917 | 11/1926 | Widdis | 47/58 |
| 1,971,390 | 8/1934 | Van Yahres | 47/48.5 |
| 1,988,307 | 1/1935 | Fay | 47/48.5 X |
| 2,351,256 | 6/1944 | Fischer | 47/DIG. 10 |
| 2,850,843 | 9/1958 | MarBury | 47/48.5 X |
| 3,309,875 | 3/1967 | Niederwemmer | 47/48.5 X |
| 4,023,308 | 5/1977 | Staby | 47/48.5 X |
| 4,117,685 | 10/1978 | Skaife | 47/48.5 X |

FOREIGN PATENT DOCUMENTS 253643 2/1911 Fed. Rep. of Germany ............ 47/48.5
2610384 9/1976 Fed. Rep. of Germany ............ 47/48.5

*Primary Examiner*—Robert E. Bagwill
*Attorney, Agent, or Firm*—James C. Wray

[57] ABSTRACT

A granular or plate-like calcium aluminum silicate layer stores water beneath fertile soil. The silicate material may be coated with fertilizer or chemicals and may be shipped and installed within a wrapping, at least one surface of which is moisture pervious. A fleece-like material may form the pervious surface. A silicate container with a perforated cover and sidewalls fits within a planter. A filler pipe extends through the soil into the container. The silicate material may be mixed with the fertile soil.

3 Claims, 4 Drawing Figures

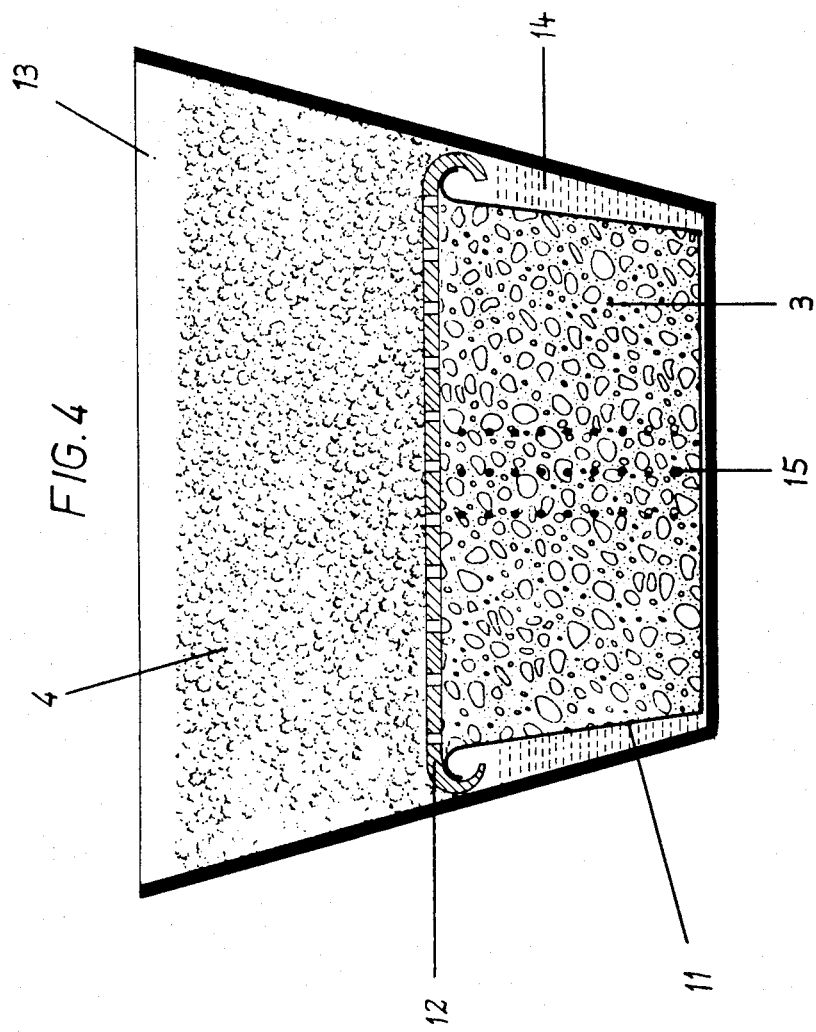

MOISTURE RESERVOIR FOR FERTILE SOILS FOR PLANTS

BACKGROUND OF THE INVENTION

The invention pertains to a moisture reservoir for fertile soils for plants.

Plants mainly pick up required moisture from the surrounding soil. To achieve the best growing of the plant, the soil has to be supplied with sufficient moisture. This usually presents a problem during draughts, when the natural watering of rain is lacking. Therefore, the soil has to receive the required moisture by artificial watering. Plants growing under protections, such as in buildings or rooms, also are watered artificially. Surely, such soils must be watered artificially quite often, as they will dry out rather quickly according to the humidity of the surrounding air. On the other hand, the moisture storage capability of fertile soils is limited. To increase the storage capability of such soils, they can be loosened. However, loose soils dry out much faster than dense soils.

SUMMARY OF THE INVENTION

The task of this invention is to find a moisture reservoir for fertile soils for plants, which is cheap to produce and easy to install.

The solution is a moisture reservoir for fertile soils for plants characterized by a granular or plate-like layer of moisture reservoir made of expanded aluminum-silicate. Preferably, this layer should be made of expanded calcium-aluminum-silicate.

Preferably, the aluminum-silicate or calcium-aluminum-silicate should be expanded at high temperatures into a granular or plate-like granulate material with large open pores formed, which is capable of storing liquids, such as water, in amounts equal to several times the material's own weight. The water will be held back and stored in those pores due to capillary action and only will be released according to the relative moisture of the surrounding medium. This moisture storing layer, if saturated with moisture or water, can store such an amount of water sufficient to provide the plants with an optimum supply of moisture over a period of several days or weeks, depending on the temperature and relative moisture of the surrounding medium. This is true for plants growing in the open as well as plants growing inside of buildings. Due to the better supply of moisture, those plants also will grow faster.

Better results can be obtained if the moisture storing layer is arranged below the fertile soils. By this procedure the moisture storing layer is not exposed to the immediate influence of the air, and the moisture stored in this layer can only be given up to the fertile soil.

If, in addition, the grains of this moisture-storing layer are soaked with fertilizers, nutritive salts or similar substances, a long time supply of such components can be achieved to help successful growing of the plants.

The moisture storing layer can also be put in a wrapping which is pervious to moisture on at least one side. Such a wrapping can also conveniently be used during transportation. In such a case, one can save the tiresome distribution of the granular granulate, because the moisture storing layer can be installed with the wrapping. Furthermore, if this layer is installed with its wrapping, the effect of this layer can be limited to a certain area, such as a flower bed which needs special care, for example.

The wrapping can be of a foil-type, for example, where at least certain sections, usually on the side exposed to the fertile soil, are pervious to moisture. The moisture pervious section can consist of a fleece-like, fibrous material.

However, it is also possible to use a container as a wrapping which can be put into flower pots, planters or similar items. The size of the container does not have to be fitted to the size of the flower pot or planter; it is sufficient that the container is just smaller. If desired, the container can be fitted with a perforated cover, so that the container and cover will form one unit for transportation purposes. This container stores a certain amount of moisture storing granulate.

The watering or sprinkling of the flower pot, planter or similar items can be done as usual, because the container with the moisture storing granulate is installed at the bottom of the flower pot or planter, where the water will collect. If desired, the walls of the container can be perforated so that during the watering process the water can better penetrate into the container.

It is also possible to install a small diameter filling pipe, extending through the fertile soil into the moisture storing layer or to the top of the perforated cover, through which water can be poured directly into the water storing layer without watering the fertile soil itself.

The moisture transmission from the moisture storing layer to the fertile soil can be increased, if between the moisture storing layer and the fertile soil, one or several wicks will be installed. Those wicks will increase, because of their capillarity, the moisture transport from the moisture storing layer to the fertile soils.

BRIEF DESCRIPTION OF THE DRAWINGS

FIG. 4 shows a cross section of a flower pot filled with appropriate material.

DETAILED DESCRIPTION OF THE DRAWINGS

Figure 1:
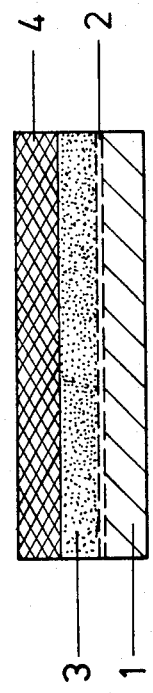
FIG. 1 is a schematic cross section of the upper soil layers of a plantation.

The example in FIG. 1 has on top of a sand layer 1 a plastic foil 2 preferably water proof. On top of this water proof plastic foil 2, a layer 3 of expanded aluminum silicate as a moisture reservoir is installed. The aluminum silicate is of a plate-like or granular structure, where the single particles of the silicate can be soaked with fertilizers, nutritive salts or similar substances. On top of the moisture storing layer 3 is a layer 4 of fertile soil, where the plants are planted (not shown on the drawing). The fertile soil itself can be mixed with aluminum silicate depending on its quality.

Figure 2:
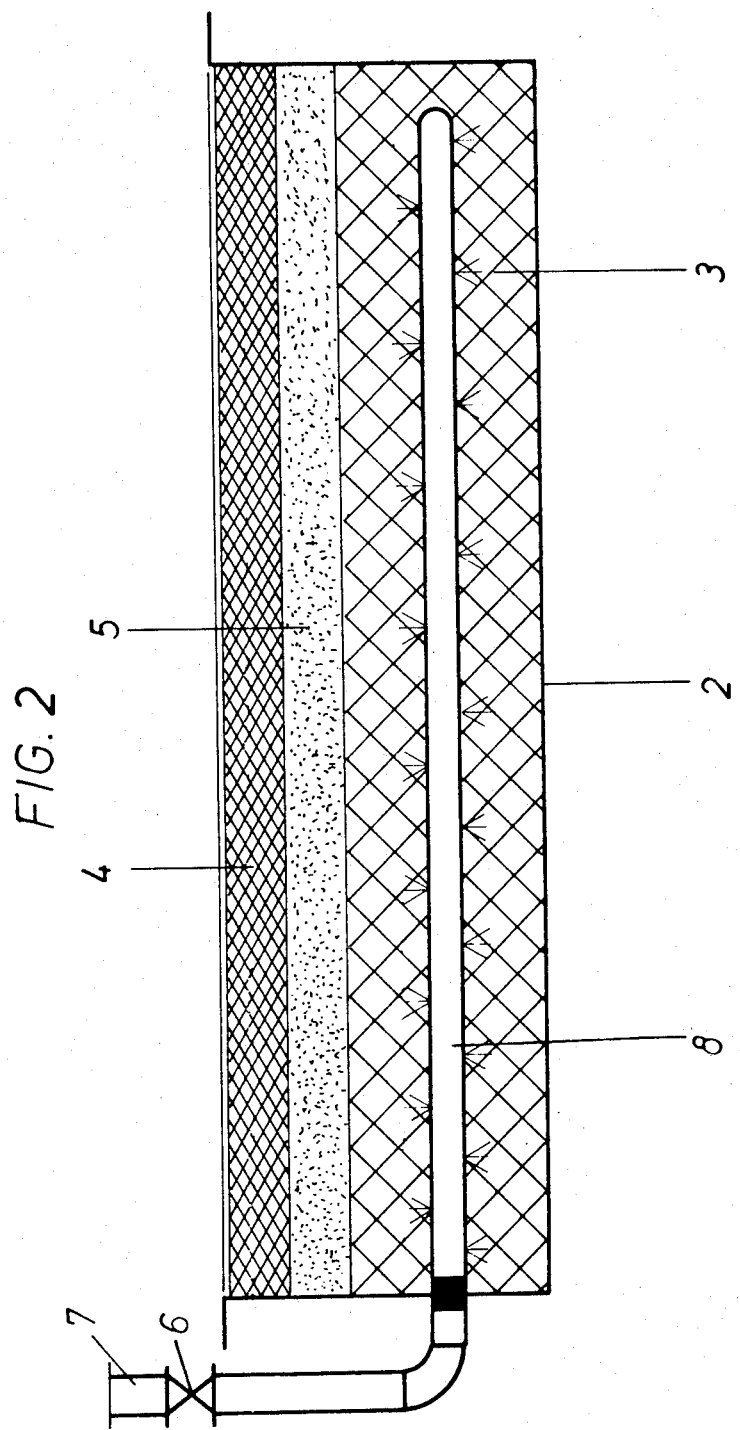
FIG. 2 is another schematic cross section of the upper soil layers of a plantation.

The example in FIG. 2 shows the moisture storing layer 3 of expanded aluminum silicate installed on top of an impermeable soil layer, which can also be formed by a plastic foil 2. Between the moisture storing layer 3 and the layer 4 of fertile soil, an additional layer 5 is installed. Layer 5 is a mixture of fertile soil and expanded aluminum silicate, mixed preferably at a ratio of 3:1, soil to expanded aluminum silicate by volume. A small diameter filling pipe 7 equipped with a valve 6 penetrates into the moisture storing layer 3, where sections 8 of the filling pipe are water pervious. The pervious sections 8 of the filling pipe 7 may be perforated with holes, through which the water can penetrate into the layer 3.

Figure 3:
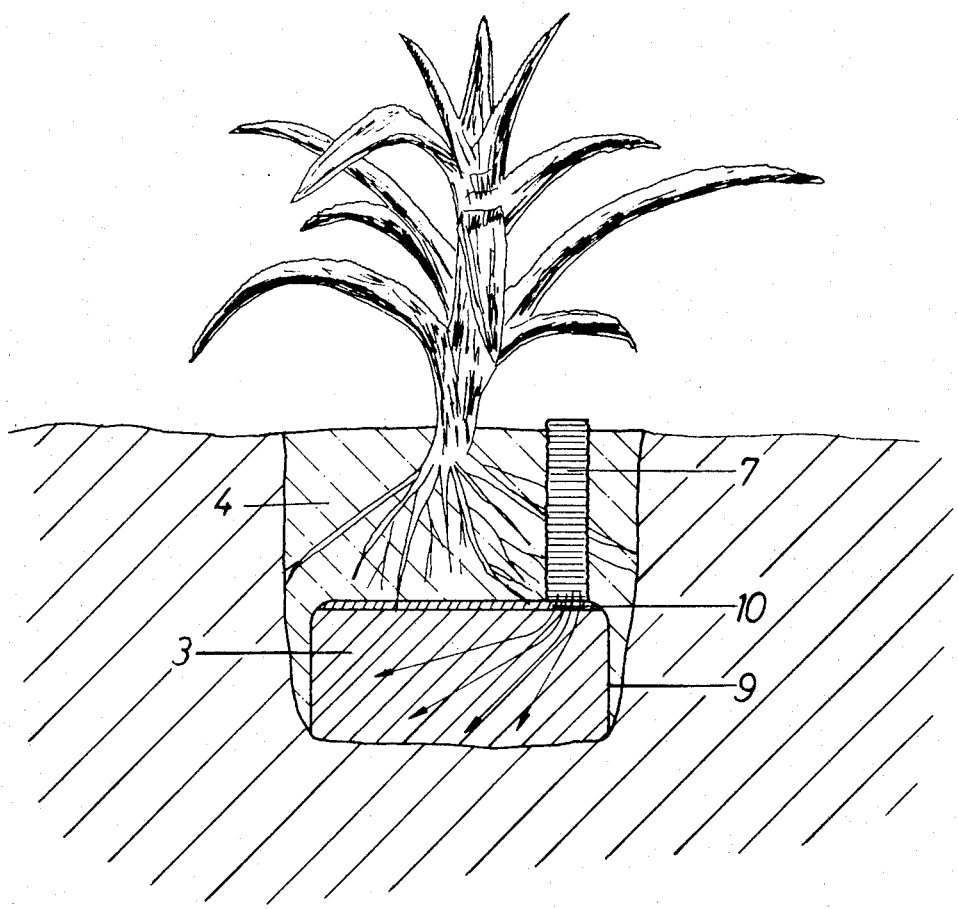
FIG. 3 shows a cross section of a flower bed.

One can see that according to the example in FIG. 3, the impermeable layer or plastic foil can be shaped like a container or can be formed by the walls of the container itself.

The cross section of a plant bed in FIG. 3 shows again the moisture storing layer 3 of granular or plate-like expanded calcium-aluminum-silicate installed under the layer 4 of fertile soil. The layer 3 is surrounded with a foil-like wrapping 9 which is pervious on the side exposed to the fertile soil. The water pervious layer 10 consists of permeable fibers in a fleece-like pattern, which transmits through capillary action water from the moisture storing layer 3 to the fertile soil 4. At the same time the wrapping 9 can be used during transportation of the expanded calcium-aluminum-silicate. Furthermore, one can see the filling pipe 7 extending through the fertile soil 4 to the top of the pervious layer 10 so that the water can directly be guided into the moisture storing layer 3.

FIG. 4 shows an example where the moisture storing layer 3 is arranged in a pot-like container 11, which can be covered with a removable and perforated cover 12. The container 3, filled with expanded calcium-aluminum-silicate, is installed inside of a flower pot 13 at its bottom. The remaining space between the container 3 and the flower pot 13 is filled with fertile soil 4. One can see, according to the example in FIG. 4, that the container 11 is smaller than the flower pot 13, causing an annulus 14 between the walls of the flower pot 13 and the walls of the container 11, where water which has been poured at the edge of the flower pot 13 will be collected. To let the water penetrate from the annulus 14 into the moisture storing layer 3, the walls of the container 11 have several rows of holes 15.

In all examples shown, the layer 3 of expanded calcium-aluminum-silicate stores amounts of water equal to several times the weight of the silicate mass. The stored water will slowly be given up to the fertile soil 4, depending on its moisture content, so that a continuous, uniform watering of the plants in the fertile soil 4 is guaranteed.

I claim:

1. A moisture reservoir for plants comprised of a soil and water impermeable first layer, a second layer of expanded aluminum silicate on said first layer, and means in said second layer for applying moisture thereto, a third layer of a mixture of soil and expanded aluminum silicate on said second layer, and a fourth layer of soil on said third layer.

2. A moisture reservoir for plants comprised of a mass of aluminum silicate surrounded on its sides and bottom by a water and soil impervious material, fibrous wicking material across the top of said mass, a soil layer on said wicking material, and a filling pipe beginning at a point above said soil layer, extending therethrough, and terminating adjacent said wicking material.

3. A moisture reservoir as in claims 1 or 2, wherein said aluminum silicate is calcium aluminum silicate.

* * * * *